(12) United States Patent
Carlucci et al.

(10) Patent No.: US 8,569,204 B2
(45) Date of Patent: Oct. 29, 2013

(54) ABSORBENT CORE

(75) Inventors: Giovanni Carlucci, Chieti (IT); Evelina Sara Toro, Chieti (IT); Silvia Steffan, Turin (IT)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/282,858

(22) Filed: Oct. 27, 2011

(65) Prior Publication Data

US 2012/0108419 A1     May 3, 2012

(30) Foreign Application Priority Data

Oct. 29, 2010    (EP) .................................. 101589456

(51) Int. Cl.
*B01J 20/26* (2006.01)
*B01J 20/32* (2006.01)
*C07C 55/24* (2006.01)

(52) U.S. Cl.
USPC ....................................... 502/402; 526/317.1

(58) Field of Classification Search
USPC ...................................................... 526/317.1
See application file for complete search history.

(56) References Cited

U.S. PATENT DOCUMENTS

| | | |
|---|---|---|
| 6,471,824 B1 | 10/2002 | Jewell |
| 2003/0029585 A1 | 2/2003 | Jewell |
| 2003/0029586 A1 | 2/2003 | Jewell |
| 2003/0037890 A1 | 2/2003 | Jewell |
| 2003/0037891 A1 | 2/2003 | Jewell |
| 2007/0078248 A1* | 4/2007 | Adachi ...................... 526/317.1 |

FOREIGN PATENT DOCUMENTS

FR     2 602 985 A1    2/1988

OTHER PUBLICATIONS

International Search Report, mailed Feb. 10, 2012, 4 pages.

* cited by examiner

*Primary Examiner* — Vu A Nguyen
(74) *Attorney, Agent, or Firm* — Andrew J. Mueller; Brian J. Bolam

(57) ABSTRACT

An absorbent core for an absorbent article comprising from 1 to 2000 mg of a not cross linked polycarboxylic acid based polymer having an average molecular weight between 1000 and 25000 Da.

8 Claims, No Drawings

ABSORBENT CORE

FIELD OF THE INVENTION

The present invention relates to an absorbent core for absorbent articles which include a low molecular weight not cross linked polycarboxylic acid based polymer to provide an enhanced effect in fluid retention.

BACKGROUND OF THE INVENTION

Absorbent articles of personal hygiene for absorption of body fluids such as menses or blood or vaginal discharges are known in the art. Typical examples include sanitary napkins, panty liners, tampons, interlabial devices, as well as wound dressings, and the like.

When considering for example sanitary napkins, these articles typically comprise a liquid pervious topsheet as wearer facing layer, a backsheet as garment facing layer and an absorbent core between topsheet and backsheet. The body fluids are acquired through the topsheet and subsequently stored in the absorbent core. The backsheet typically prevents the absorbed fluids from wetting the wearer's garment.

An absorbent core can typically comprise one or more absorbent materials such as for example natural or synthetic absorbent fibers, foams and/or superabsorbent materials, such as absorbent gelling materials (AGM), usually in finely dispersed form, e.g. typically in particulate form. Conventional superabsorbent materials known in the art for use in absorbent articles typically comprise water insoluble, water swellable, hydrogel forming crosslinked absorbent polymers which are capable of absorbing large quantities of liquids and of retaining such absorbed liquids under pressure. In general, absorbent articles comprising conventional AGM commonly have good absorption and retention characteristics to water and urine; however, there still remains room for improvement for absorption and retention towards certain liquids. In particular, proteinaceous or serous body fluids such as typically menses, blood, plasma, vaginal secretions, mucus or milk, require more time to be effectively absorbed by the AGM and consequently, especially in case of large amount of fluids, these might not be retained by the article and may leak outside.

In some cases the absorbent core of an absorbent article (as in the so called "thick" pads) does not contain superabsorbent polymers but bases its absorption properties on the absorption capacity of fibers as cellulose, viscose or rayon. In these case the lack of a superabsorbent polymer which immobilizes the fluid, even if compensated by a larger amount of absorbent fibers, may also lead to leakage or rewet phenomena.

Therefore in some cases it may be desirable to provide absorbent articles which are able to prevent leakage of body fluids, especially proteinaceous body fluids, even in the case when large amounts of fluids are discharged and even in article which do not contain superabsorbent polymers.

SUMMARY OF THE INVENTION

The present invention relates an absorbent core for an absorbent article comprising from 1 to 2000 mg of a not cross linked polycarboxylic acid based polymer having an average molecular weight between 1000 and 25000 Da.

Absorbent articles comprising a core according to the present invention have improved fluid retention properties especially for proteinaceous fluids.

DETAILED DESCRIPTION OF THE INVENTION

The term "absorbent article" is used herein in a very broad sense including any article able to receive and/or absorb and/or contain and/or retain fluids and/or exudates, especially bodily fluids/bodily exudates. Exemplary absorbent articles in the context of the present invention are disposable absorbent articles. The term "disposable" is used herein to describe articles, which are not intended to be laundered or otherwise restored or reused as an article (i.e. they are intended to be discarded after a single use and preferably to be recycled, composted or otherwise disposed of in an environmentally compatible manner). Typical disposable absorbent articles according to the present invention are surgical and wound dressings, incontinence pads, as well as absorbent articles for feminine hygiene like sanitary napkins, panty liners, tampons, interlabial devices or the like. Absorbent articles within the meaning of this disclosure include any type of structures, provided they comprise an absorbent element or "core". Certain absorbent articles include a fluid pervious topsheet, a backsheet, which may be fluid impervious and/or may be water vapour and/or gas pervious, and an absorbent core comprised there between. For "absorbent core" of an absorbent article it is intended the combination of all absorbent materials making up the absorbent article. For example for sanitary napkins and pantyliners which usually include a topsheet and a backsheet, the "core" is the whole absorbent article excluding topsheet and backsheet, while for a vaginal tampon is the tampon pledget excluding the overwrap (if present) and the extraction cord.

The term "use", as used herein, refers to the period of time that starts when the absorbent article is actually put in contact with the anatomy of a wearer.

By "body fluid" or "bodily fluids" it is meant herein any fluid produced by human body including, but not limited to, perspiration, urine, menstrual fluids, vaginal secretions, milk and the like.

The present invention relates to an absorbent core for absorbent articles comprising a low molecular weight not cross linked polycarboxylic acid based polymer.

For polymer having "low molecular weight", in the context of the present invention, it is intended a polymer having a weight average molecular weight between 1000 Da and 25000 Da. Polymers having a molecular weight lower than 1000 Da are less effective in improving the retention of body fluids, polymers having a higher molecular weight have a lower solubility kinetic which may reduce their effectiveness in improving the retention of bodily fluids and are more difficult to introduce in absorbent cores as concentrated water solution because their water solutions are highly viscous. In certain embodiments of the invention the average molecular weight of the low molecular weight not cross linked polycarboxylic acid based polymer can be comprised between 2000 Da and 20000 Da or between 5000 Da and 15000 Da. The average molecular weight can be measured by a skilled person with one of the methods known in the art, for example by means of a Gel Permeation Chromatography method.

For "polycarboxylic acid based polymer" in the context of the present invention it is meant polymers comprising carboxylic groups after polymerization. The carboxylic groups present in the polycarboxylic acid based polymers of the invention, can be in acid form or in neutralized form also called "salt" form or can be partly in acid form and partly in neutralized form. When in salt form the cation forming the salt is not critical, so any cation is in principle suitable. In most embodiments alkaline or alkaline earth cations will be used, where alkaline are preferred as their salts are more soluble. In some embodiments cations of sodium potassium, lithium or mixtures thereof will be used.

In the context of the present invention polycarboxylic acid based polymers can in principle be used at all degrees of neutralization, and whenever a "polycarboxylic acid based polymer" is mentioned, unless differently specified, it is intended to refer to the polymer at any degree of neutralization.

In some embodiments "polycarboxylic acid based polymers" can be used in totally neutralized form. In other embodiments of the present invention "polycarboxylic acid based polymers" can be used in partially neutralized form. This means that the acidic polymer has been neutralized with a basic material in an amount which was not sufficient to neutralize all acidic groups but only a part of them. Partially or totally neutralized polymers are in general more readily soluble and thus providing a faster effect.

In all embodiments mentioned above the "polycarboxylic acid based polymers" can be introduced within the absorbent core of the present invention as a powder or, preferably, as concentrated water solutions.

In water solution the acid and basic forms of the carboxylic groups will coexist in chemical equilibrium and the pH of the solution determines the degree of neutralization of the acidic groups of the polymer pH and can be easily controlled by a skilled person by the addition of alkaline or acid compounds to the solution using common techniques. It is common practice for a skilled person to calculate the degree of neutralization of the polymer basing on the pH of the water solution and the pKa of the acidic groups (pKa values for various types of acidic groups are commonly available in literature).

Example polycarboxylic acid based polymers which are suitable for the present invention include the following with their salts: polyacrylic acid, polymethacrylic acid, polymaleic acid, and derivatives thereof, such as for example starch grafted polyacrylic acid, starch grafted polymethacrylic acid, polyvinyl alcohol grafted polyacrylic acid, polyvinyl alcohol grafted polymethacrylic acid, cellulose grafted polyacrylic acid, cellulose grafted polymethacrylic acid.

In some embodiments polyacrylic acid is used, or partially neutralized polyacrylic acid or completely neutralized polyacrylic acid.

The absorbent core of the present invention comprises one or more absorbent materials selected from natural or synthetic absorbent fibers (e.g. cellulose fibers, rayon fibers and the like), absorbent foams, superabsorbent polymers (e.g. AGM). The low molecular weight not cross linked polycarboxylic acid based polymer may be incorporated in the absorbent core in any manner available to the skilled man such as finely dispersed within the absorbent core and/or partially or totally absorbed within the absorbent fibers or the superabsorbent polymers of the absorbent core, or coated or printed on or within the absorbent core.

The amount of low molecular weight not cross linked polycarboxylic acid based polymer which is present in the absorbent core according to the present invention is from 1 to 2000 mg per each absorbent core, or from 2 to 1000 mg per each absorbent core, or from 5 to 500 mg per each absorbent core, or from 10 to 250 mg per each absorbent core.

In some embodiments, the absorbent core of the present invention is essentially free of superabsorbent polymers (for "essentially free" it is meant that comprises less than 100 mg of superabsorbent polymer per each core). Examples of absorbent cores of this type are e.g. absorbent cores comprising more than 80% (or more than 90% or more than 95% or more than 99%) by weight of cellulosic or synthetic fibers or more than 80% (or more than 90% or more than 95% or more than 99%) by weight of an absorbent foam or more than 80% (or more than 95% or more than 99%) by weight of a mixture of cellulosic or synthetic fibers and absorbent foam.

In these embodiments the present invention is particularly advantageous because absorbent cores of this type, being essentially free of superabsorbent polymers, rely on the absorption capacity of cellulosic fibers and/or of the foam. Fibers and foam absorb and retain liquids effectively, however they might be less resistant than superabsorbent polymers in retaining liquids under some conditions. Such absorbent cores comprising, in accordance to the present invention, from 1 to 2000 mg of low molecular weight not cross linked polycarboxylic acid based polymer, are able to increase the viscosity of the proteinaceous fluids thus reducing the risk of rewet in a simple and cost effective way.

The low molecular weight not cross linked polycarboxylic acid based polymers can be introduced within the absorbent core of the present invention in any form, including in dry powder form, as a suspension in a liquid or as a solution.

In some embodiment the low molecular weight not cross linked polycarboxylic acid based polymer is introduced within the absorbent core as a water solution. The use of a water solution allows an easy introduction of the low molecular weight not cross linked polycarboxylic acid based polymer within the absorbent core directly in line during the manufacture of the core in the plant without the need to handle powders which would requires more complex and expensive procedures for their safe handling. In some embodiments water solutions of the low molecular weight not cross linked polycarboxylic acid based polymer are used with contain from 10 to 70% or from 20% to 60% by weight of polymer. More diluted solutions would bring too much water within the core leaving it wet, more concentrated solutions, would be too viscous for easy handling.

In some embodiments the water solutions of the not cross linked polycarboxylic acid based polymer will include the polymer in partially or totally neutralized form. The pH of the water solution in some embodiment will be from 2 to 12, in other embodiments from 3 to 10, in other embodiments from 4 to 8.

The present invention also relates to a method for manufacturing an absorbent core for an absorbent article, this method comprising the step of applying a water solution of not cross linked polycarboxylic acid based polymer having an average molecular weight between 1000 and 25000 Da onto the absorbent core so that each absorbent core will contain from 1 to 2000 mg of a not cross linked polycarboxylic acid based polymer. Any of the solution types mentioned above can be used in the method of the present invention. Such solution in some embodiment can be sprayed, in other embodiments can be printed or in other embodiments can be slot coated onto said absorbent core.

An absorbent article comprising an absorbent core according to the present invention has an improved capacity to retain body fluids, particularly proteinaceous or serous body fluids such as typically menses, blood, plasma, vaginal secretions, mucus or milk.

Without wishing to be bound by theory this is believed that the low molecular weight not cross linked polycarboxylic acid based polymer interacts with the proteins present in the body fluid so to cause a increase in viscosity and an increased retention of the crosslinked fluid within the absorbent article. The low molecular weight not cross linked polycarboxylic acid based polymer can also form hydrogen bonding with cellulose if present further enhancing the retention of the fluids.

In all embodiments described, the absorbent core of the present invention can be used in a feminine hygiene article like a sanitary napkin, an interlabial pad, a vaginal tampon or a pantyliner.

EXAMPLE

Two 20×6 cm matts of cellulose fluff (from defiberized cellulose) having a thickness of 10 mm and a basis weight of 400 grams per square meter were provided. Each of these portions is a typical absorbent core for "thick" sanitary napkins.

200 mg of Lubrizol Novelrite™ K-7058N (a 45% water solution of a polyacrylic acid at pH 6.5-7.5 where the polymer has an average MW of 7300 Da) were homogeneously sprayed on the bottom side of one of the 20×6 cm portions. This is identified as sample A.

The other 20×6 cm portion was left untreated and was identified as sample B.

The rewet performance of sample A was compared with the rewet performance of sample B.

The rewet performance is measured using a rewet test described below with the following parameters:
1 assault of 7 ml of AMF on a surface of 4×3 cm, added in 90 seconds.
20 minutes before press
1 psi of pressure
Rewet results: Sample A: 1 mg, Sample B 163 mg.

Rewet Test Description

The rewet method is utilized to assess the dryness of the absorbent core structure with respect to its wearer facing surface, i.e., typically the first surface of the second or cover layer thereof. The test fluid that is utilized for this test is Artificial Menstrual Fluid (AMF). AMF is a fluid based on sheep's blood which is modified to ensure it closely resembles human menstrual fluid in viscosity, electrical conductivity, surface tension and appearance. AMF it is prepared as described in U.S. Pat. No. 6,417,424 assigned to The Procter & Gamble Company, from line 33 of column 17 to line 45 of column 18, to which reference is made.

Apparatus:
1) Blotting Paper available from Whatman (Germany) S & S Rundfilter/Durchmesser 150 mm, No.; 597, Reference-No.: 311812.
2) A weight of 4200 g covered on the lower surface with a foam of moderate flexibility. Both the weight and foam are covered with a thin, flexible plastic film to avoid the foam absorbing fluid. The weight dimensions should allow a 6 cm×10 cm surface to contact the sample under examination. Pressure exerted onto the sample=70 g/cm2.
3) A perspex (7 mm thick) plate of dimensions 6 cm×10 cm with a hole of dimensions 3 cm×4 cm centered in the template.
4) A burette capable of introducing the test fluid at a reproducible rate of 7 ml in 90 seconds.
5) An analytical balance capable of reading to 4 decimal places.

Sample Preparation/Measurement.

The sample article to be assessed is placed on a flat laboratory surface with the topsheet layer facing up and centred directly below the burette for test liquid delivery. The perspex plate is positioned on the sample, centered on it, and the AMF test liquid is introduced over the exposed area corresponding to the hole in the perspex plate. After 90 seconds 7 ml of AMF have been introduced to the sample and an electronic counter set to 20 min is activated. During this waiting period a stack of 7 discs of filter paper are weighed on the analytical balance and the weight is recorded.

After 20 min the perspex plate is removed and the stack of filter papers is positioned centrally on the sample being assessed and the weight is gently lowered onto the filter paper stack. The sample and filter paper stack remain under the pressure exerted by the weight for a period of 15 seconds, after which the weight is carefully removed and the filter paper stack is re-weighed. The difference in weight (to the nearest milligram) is recorded as the rewet value. Each test is repeated for at least 5 samples and averaged to ensure adequate accuracy of the measurements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent core for an absorbent article comprising from about 10 to about 250 mg of a not cross linked polycarboxylic acid based polymer having an average molecular weight between 1000 and 25000 Da, as measured by Gel Permeation Chromatography.

2. An absorbent core according to claim 1 wherein said not cross linked polycarboxylic acid based polymer is a partially or totally neutralized polyacrylic acid.

3. An absorbent core according to claim 1 wherein said not cross linked polycarboxylic acid based polymer is introduced as a water solution.

4. An absorbent core according to claim 1 which is essentially free of superabsorbent polymers.

5. A method for manufacturing an absorbent core for an absorbent article according to claim 1 comprising the step of applying a water solution of the not cross linked polycarboxylic acid based polymer onto a component of said absorbent core.

6. The method of claim 5 wherein said water solution has a concentration of from 10% to 70% by weight of polymer.

7. The method of claim 5 wherein said absorbent core is essentially free of superabsorbent polymers.

8. An absorbent article comprising the core of claim 1, the article being selected from a sanitary napkin, a panty liner or a tampon.

* * * * *